M. B. TARK.
FILTRATION APPARATUS AND SYSTEM.
APPLICATION FILED FEB. 12, 1916.

1,188,340.

Patented June 20, 1916.
7 SHEETS—SHEET 1.

Fig. 1.

Inventor
Marcus B. Tark,
By
Attorney

M. B. TARK.
FILTRATION APPARATUS AND SYSTEM.
APPLICATION FILED FEB. 12, 1916.

1,188,340.

Patented June 20, 1916.
7 SHEETS—SHEET 3.

M. B. TARK.
FILTRATION APPARATUS AND SYSTEM.
APPLICATION FILED FEB. 12, 1916.

1,188,340.

Patented June 20, 1916.
7 SHEETS—SHEET 5.

M. B. TARK.
FILTRATION APPARATUS AND SYSTEM.
APPLICATION FILED FEB. 12, 1916.

1,188,340.

Patented June 20, 1916.
7 SHEETS—SHEET 7.

UNITED STATES PATENT OFFICE.

MARCUS B. TARK, OF PHILADELPHIA, PENNSYLVANIA, ASSIGNOR TO THE SEWAGE CLARIFICATION COMPANY, OF WILMINGTON, DELAWARE, A CORPORATION OF DELAWARE.

FILTRATION APPARATUS AND SYSTEM.

1,188,340.  Specification of Letters Patent.  Patented June 20, 1916.

Application filed February 12, 1916. Serial No. 77,978.

*To all whom it may concern:*

Be it known that I, MARCUS B. TARK, a citizen of Switzerland, residing at Philadelphia, in the county of Philadelphia and State of Pennsylvania, have invented new and useful Improvements in Filtration Apparatus and Systems, of which the following is a specification.

This invention relates to apparatus and systems of filtering in general and pertains particularly to the removal of suspended solids from fluids.

The invention relates either to the filtering of water, industrial and municipal sewage, or cooling water for condensers.

One object of the invention is to provide a method and apparatus for removing from sewage the animal and vegetable matter suspended therein which is subject to decay.

Another object of the invention is to provide means for so purifying sewage that it may be discharged into streams or used as fertilizer without pollution or the causing of objectionable conditions.

Another object of the invention is to provide a new and practical rotary filter apparatus for separating solids from liquids which is positive in its action and by which the solids are positively removed from the matter treated.

Another object of the invention is to provide a separator of the endless conveyer band type in which practically the entire machine is surrounded by the material to be filtered, separated liquid discharging from the space within the machine, the solids being removed from the exterior at the immediate top thereof.

Another object of the invention is to provide a rotary separator in which material to be filtered is led into the interior of the machine, separated liquid being withdrawn from the exterior and the separated solid being gathered within the interior and conveyed away.

A further object of the invention is to provide means coacting with a rotary filter for removing the separated solids from the filter member.

A further object of the invention is to provide a rotary brush for accomplishing the cleaning of the filter member and includes the novel mounting and driving means for said brush.

A further object of the invention is to provide a means for the treatment of sewage which means includes the use of the novel separating means and sludge digesting tanks for the treatment of the separated solids, separate compartments being provided for sludge in different stages of treatment.

The invention consists in the novel construction and arrangement of parts together with the novel means and the operation of the apparatus, and the means in combination with the digesting tanks and will be more fully described and set forth in the following specification and claims, and illustrated in the accompanying drawings in which—

Like numerals refer to like parts in the different figures.

The structures of the filter machines described herein are designed to have an unusually large percentage of submerged area, in position for operation. The construction of the machines provides for perfect balance, thus insuring low power consumption and low cost of operation and maintenance. Extreme simplicity and accessibility of parts makes for easy supervision and cleanliness.

In the present invention the movable filter surface is provided with sludge plates coacting with the surfaces to lift the solids and carry them with the surface to a point where a cleaning device removes them. The material treated would slip off of and not adhere to the filter surface unless that surface is provided with the sludge plates mentioned herein.

One of the serious problems in the filtration systems heretofore in use has been the question of disposal of the sludge. By the present invention the offensive portions of the sewage are separated and treated in sludge digestion chambers. The separated liquids thus freed from the offensive portions may safely be returned to open streams or rivers without fear of harmful pollution by the latter and the comparatively small volume of matter left over from the final treatment in the digestion tanks provides an inoffensive fertilizer.

The rotary separator shown and described in detail is of the cylindrical or drum type, but any other form such as the cone, disk or endless conveyer or band types may be used, the sludge retaining plates and cleaning apparatus being adaptable to either type of machine. So also these plates may be arranged on any part of the machine without departing from the scope of the invention.

The rotary separator consists of screening plates, wire mesh or any other screening medium fastened to a structure of steel or frame of any other material which in turn is mounted on a shaft. Swinging or sliding plates are used to retain the screenings on the surface of the filter medium and convey them to the cleaning mechanism which latter removes the solid matter from the surface of the drum. The cleaning mechanism may consist of one or more revoluble brushes hung between two chains and having a peripheral turning movement opposite to that of their travel.

The structures hereinafter described should be suitably located with respect to the inlet and outlet passages of a sewage system, suitable retaining walls and foundations being provided for the machines as illustrated in the drawings.

Figure 1:
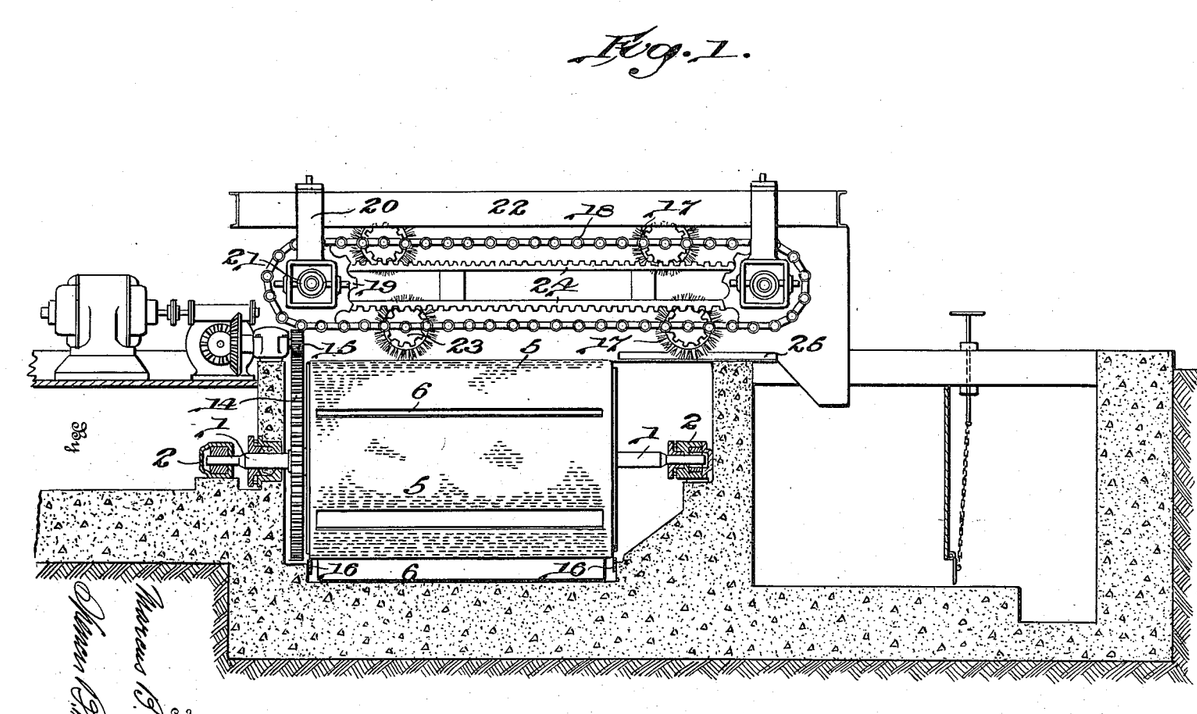
Figure 1 represents a side elevation, partly in section, of a rotary type filter, the blades projecting from within the cylindrical drum, the brush being arranged to clean the drum and convey the filtered solids to one of the compartments of the sludge digestion tank on the right.
Figure 2:
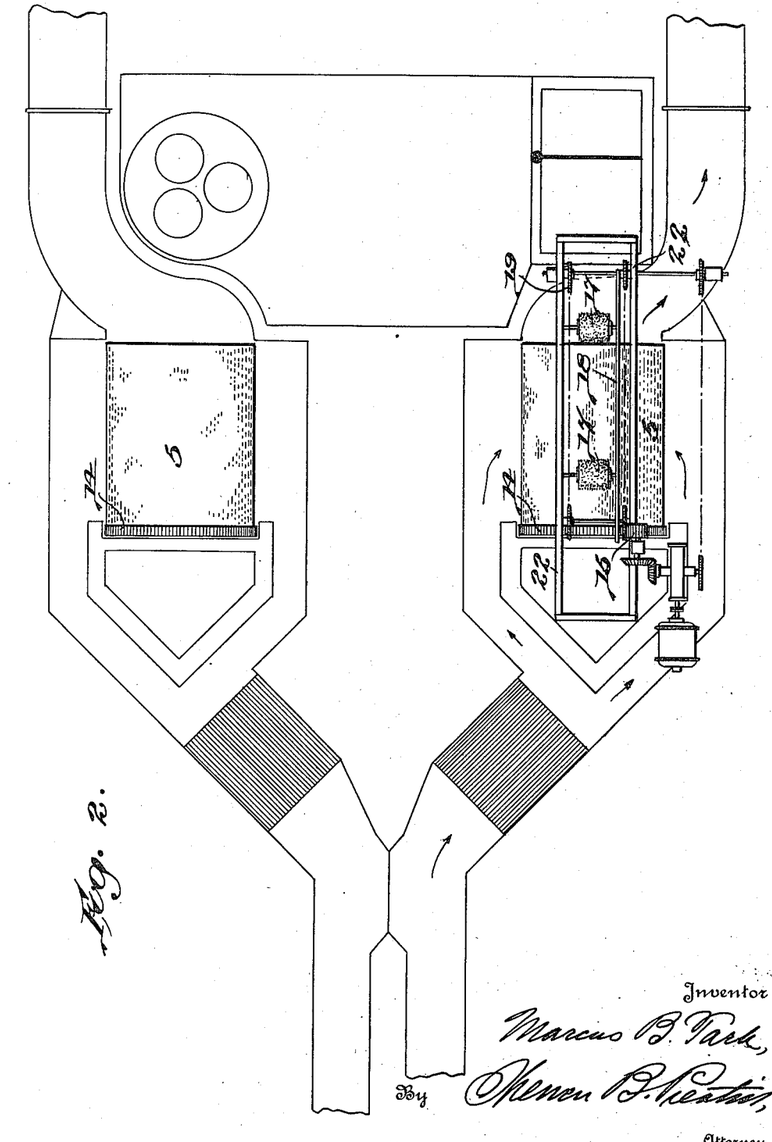
Fig. 2 is a top plan view of a system arranged for a plurality of filter machines, a view of the machine illustrated in Fig. 1 being shown as installed, a plurality of receiving buckets being shown in connection with one filter machine in place of the digestion tank shown with the other machine.
Figure 3:
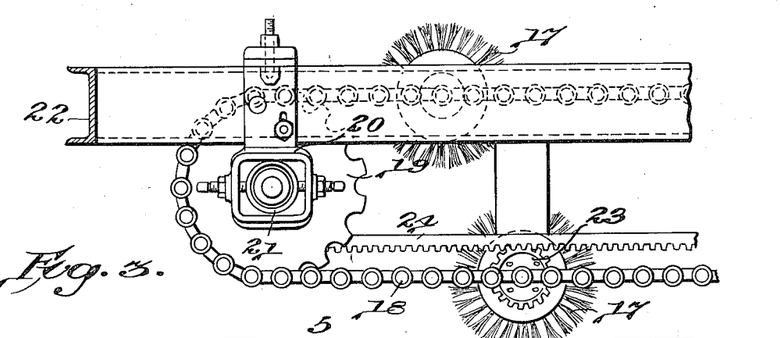
Fig. 3 is a vertical sectional view, partly broken away, of the rotary machine illustrated in Fig. 1.
Figure 4:
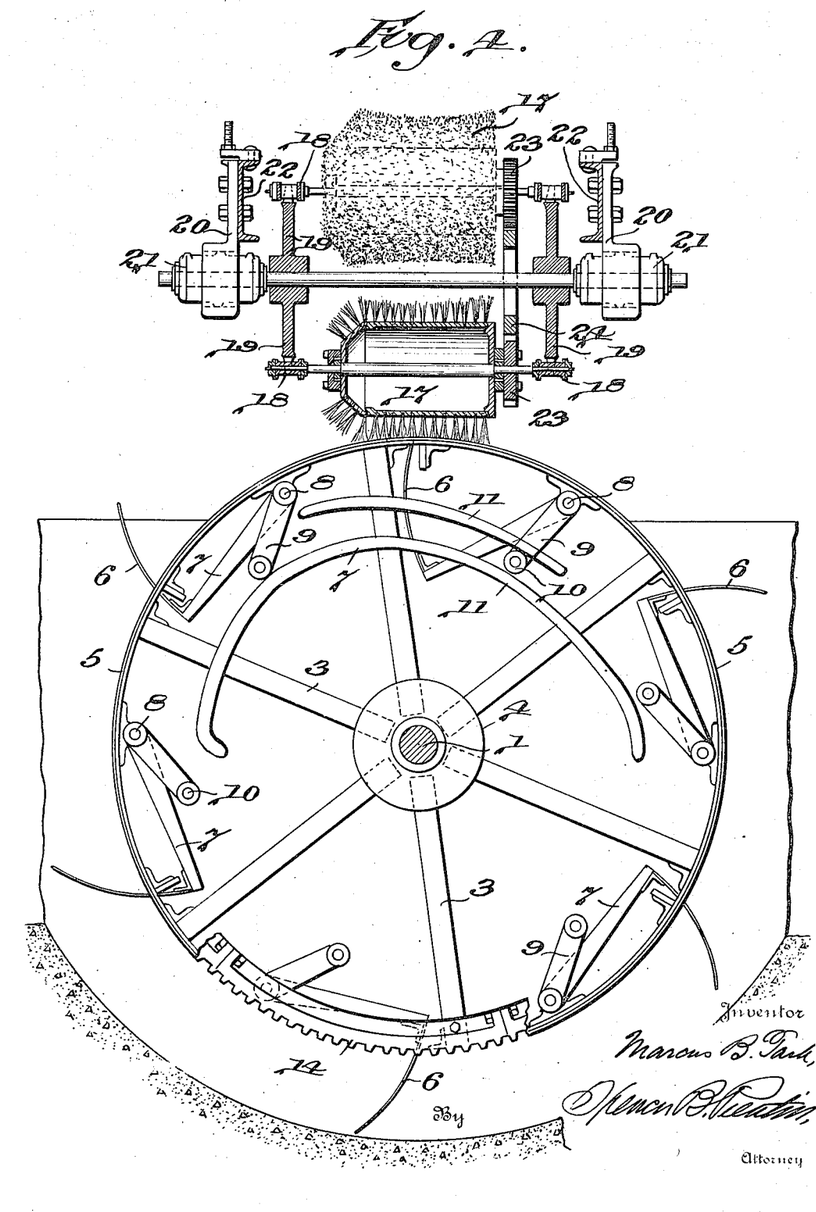
Fig. 4 is a transverse vertical section of the machine illustrated in Fig. 1, showing the relation of the disappearing blades to the cylinder and cleaning brush.

1 represents the main shaft rotatably mounted in the bearings 2 on its horizontal axis. The structural steel frame 3 is connected by the disks 4 to the shaft 1. The perforated screening surfaces 5, formed of any suitable filtering medium such as perforate plates, are fastened by screws, rivets or clamps to the framework 3, the sludge plates 6 are fastened by suitable arms 7 to the rocker shaft 8. Rocker arms 9 are also fastened to the rocker shaft 8 and carry at their extreme ends the roller 10 which engages the guides 11 and hold the sludge plates in their proper position as will be mentioned further. Brackets 12 connect the guides 11 to the end wall plates 13 which should be suitably fastened to the foundation wall.

The filter machine is rotated by means of a gear 14 mounted to engage with a pinion gear 15 driven by a motor or any other suitable means. Suitable sealing means in the form of the rings 16, acting as gaskets, prevent any material from passing the separator from the edge adjacent the filter surface to the end of the machine not covered by the filter material.

Brushes 17 or other cleaning means are suspended between the chains 18 which are driven by the sprockets 19. The sprockets 19 and the sprocket shafts are extended by suitable hangers 20 and bearings 21 from a steel frame 22. A pinion 23 mounted in conjunction with the brush is rotated to drive the brush by a rack bar 24. It will be understood that as the chain 18 draws the brush the latter is rotated by the pinion 23 engaging with a stationary bar 24.

Screenings or filtered solids when carried to the top of the machine are brushed from the machine along the trough 25 leading from the machine and are dropped into buckets, any form of conveying means or into individual tanks of sludge digesting apparatus. In the latter case a plurality of tanks or compartments are provided so that solids collected for one period of time may be collected in separate vessels from those collected in a subsequent period. The necessity for this plurality of tanks for the aging of the solids will be obvious to any familiar with the art.

The operation of the machine proceeds substantially as follows: The sewage or other fluid to be clarified is led into the space surrounding the separator. As the machine is driven and the filter surface moves upward the suspended solids are retained by the screening medium and the sludge plates and are carried to the top of the separator where they are removed by the brushes. Any screenings or solids that may slide from the filter surface or collect in the bottom of the chamber inclosing the machine are caught up by the sludge plates and conveyed to the top of the machine. In addition to lifting out all the solids the scum on the top of the fluid is carried up also by the machine and the plates. The plates are held in their position by the rocker arms and guides. In the upward travel of the plates they project through the slots in the filter surface until they approach the brush when they are gradually withdrawn until flush with the filter surface. During the withdrawal movement one end of the brushes engages with the plates to clean the latter. It will be noted that the brushes are suitably formed at one end to provide for this cleaning action, Figs. 4 and 5. After passing beneath the cleaning brushes as the machine continues to rotate the sludge plates are again swung out by the rocker arms and guides. In the lower half of the machine the guides are discontinued to allow the sludge plates to swing back and be retracted should they strike a foreign body. After leaving the machine the sludge is brushed through a trough to the digestion tanks previously mentioned. In these tanks the organic parts of the sludge will be digested and the final product will be an inoffensive, humus like substance which can be readily used for fertilizer or other purposes.

One of the troubles heretofore common to the digestion method of treating sewage sludge has been the bulky nature of the matter to be treated. The present invention provides for the use of a mechanical separator to remove the solids and other organic matter from the sewage and successively treating the solids thus mechanically separated. The mechanical separation provides a sludge mass having a low moisture content, the digestion treatment thereof being greatly facilitated by the small volume and the fact that the bulky fluid content is not present. Different bacteria act on the sludge in different stages of digestion. It is necessary to keep separate the fresh sludge from the filter machine and the partly digested sludge and it is therefore advisable to have a plurality of digestion compartments to receive the separated solids. The percentage of organic matter in the sludge is very high, and as this organic matter is an offensive part, it is thus seen that the present invention provides an advantageous result by the perfect removal of the solid content from the sewage and the digestion of the same in the sludge digestion tanks.

The statements made with respect to the operation of the apparatus and system, while directed particularly to the cylindrical type of machine illustrated in Figs. 1-4, apply likewise to the structures illustrated in the remaining figures. So also the structures illustrated in any of the figures of the drawing may be used in connection with the other parts of the system.

The modifications illustrated in Figs. 5-10 may form the apparatus for the separation and cleaning of the sludge solids from the unfiltered material and thus constitute the apparatus for performing the first operation of the system, the final operation being the treatment of the sludge in the compartments of the tank.

Figure 5:
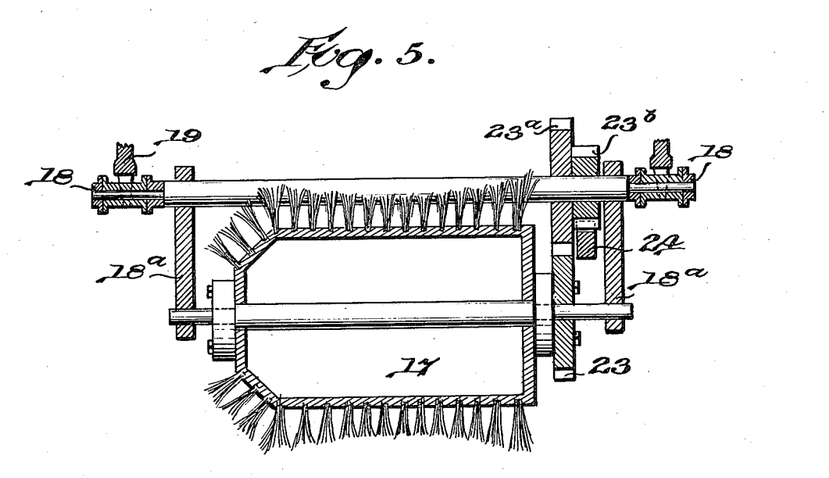
Fig. 5 is a view of the modification of the mounting for the cleaning brush, the axle being hung on swinging arms to be in constant engagement with the surface of the filter member, this arrangement providing for the automatic taking up of the wear on the bristles, thus making unnecessary the vertical adjustment of the hangers illustrated in Figs. 1, 3 and 4.
Figure 6:
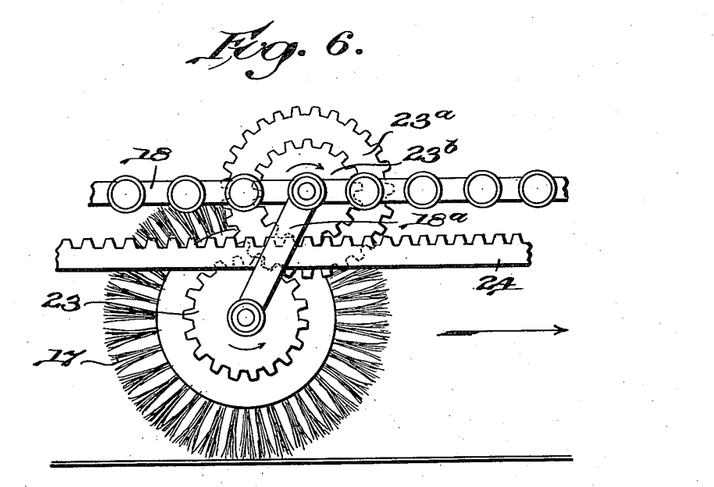
Fig. 6 is an end view of the brush mounting shown in Fig. 5, the brush being mounted to have a peripheral movement counterclockwise as it moves in the direction of the arrow.
Figure 7:
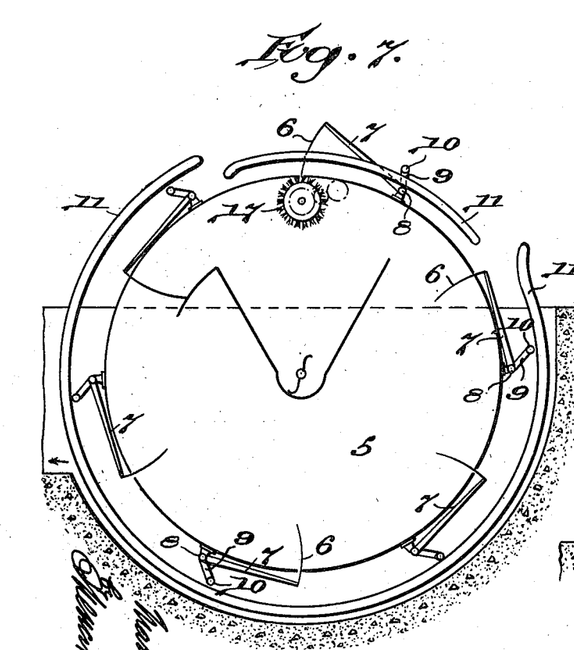
Fig. 7 is a diagrammatic view of a modification of the rotary filter, the blades projecting inwardly, the unfiltered material entering in the lower part of the filter, the separated fluid passing off from the exterior of the drum while the solids are carried away by suitable screw conveyers.
Figure 8:
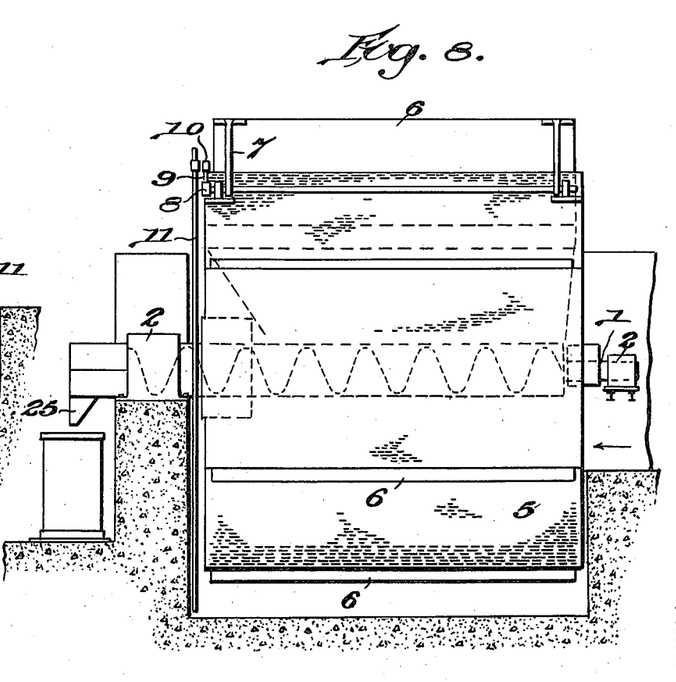
Fig. 8 is a side view of the machine illustrated in Fig. 7, the screw conveyer discharging into a sludge bucket.
Figure 9:
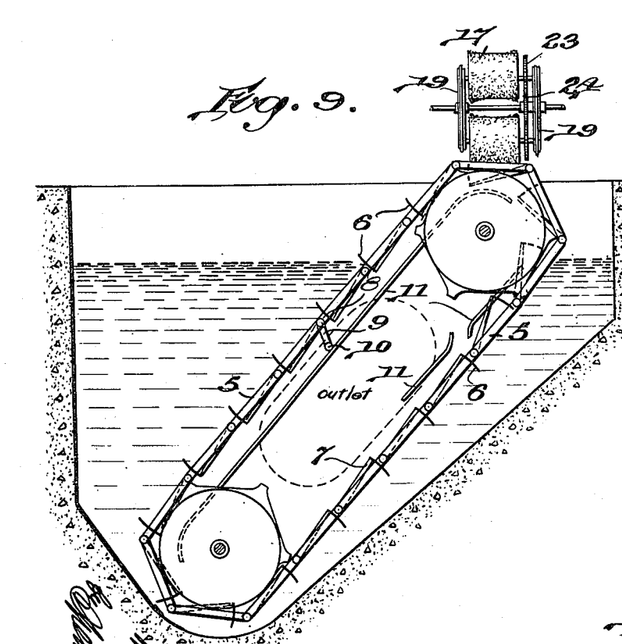
Fig. 9 is a diagrammatic view of a modification of the filter machine, the movable member comprising a continuous band or endless belt of filter material, the blade projecting through toward the exterior, solids being cleaned from the topmost portion of the exterior and the separated fluid being lead away from the interior of the machine.
Figure 10:
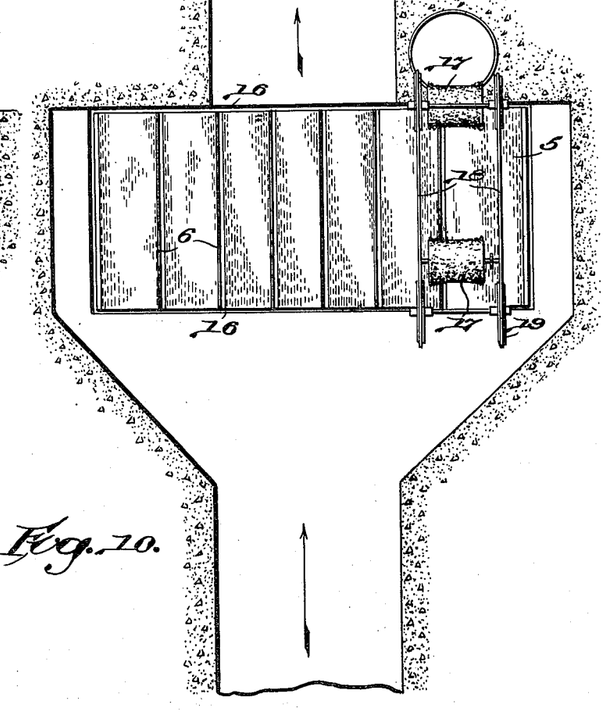
Fig. 10 is a top plan view of the machine illustrated in Fig. 9.

Referring in detail to the structures illustrated in Figs. 5-10 it will be noted in Fig. 5 that the brush elements 17 are hung from the chain 18 on hanger arms $18^a$. The driving sprocket 19 operates to drive the chain 18 as in the structures shown in Figs. 1-4. The pinion 23 on the brush member is driven by the pinions $23^a$ and $23^b$, which latter coacts with the rack bar 24. It will be observed from the arrows that as the chain 18 moves the brushes longitudinally the pinions $23^a$ and $23^b$ are turned clockwise and the pinion 23 counterclockwise. The brush 17 is free to swing from the pinions 23 having as its axis the center of the pinion 23 and as the radius arm the hanger arm $18^a$. The brush may rest of its own weight on the surface of the filter medium to be cleaned and because of its swinging mounting may adapt itself to irregularities in the cleaning surface or changes in distance between the chain 18 and the surface of the filter medium. This form of mounting for the brush cleaning mechanism provides for the automatic taking up of wear of the brush bristles, thus making unnecessary the adjustment of the hangers 20. Fig. 6 is an end view of the brush mounting illustrated in Fig. 5, the arrows indicating the relative travel and turning movement of the brush. Fig. 7 is a diagrammatic view of a modification of the rotary cylindrical filter, the blades projecting inwardly, the unfiltered material entering into the lower part of the filter, the separated fluid passing off from the exterior of the cylindrical surface while the solids are carried away by a centrally located screw conveyer. The rocker shafts 8, rocker arms 9 provided with the rollers 10 are mounted on the exterior of the cylindrical surface. The arms 7 carrying the sludge plates 6 are likewise on the exterior and mounted to project the plates 6 into the interior of the 1 machine. The cam guides 11 are likewise located on the exterior and between the drum and the foundation walls of the filter chamber. In the rotation of the filter machine material is lifted by the sludge plates and carried to the top of the inside of the cylinder. At this point the cleaning brush 17, mounted within the cylinder, engages with the filter surface to remove any material and discharge it into the hopper like receiver in the center of the machine. It will be observed that the side walls of this hopper extend well up from the center of the machine so that the contents of the hopper may not be moistened by contact with the liquid content of the unfiltered material. At the bottom of the hopper a suitable conveyer is arranged to carry the solids axially from one end of the machine to the digestion tanks, see Fig. 8. Referring to the modifications shown in Fig. 9 it will be noted that the movable filter surface illustrated comprises a continuous band or endless belt of filter material provided with the blade members 6, arms 7, rocker shaft 8, rocker arms 9 and rollers 10 as in the other forms illustrated. The filter surface or band passes over two sprocket members arranged at the top and bottom respectively of the screening chamber. The sides of the filter machine are substantially water tight as in the other forms previously mentioned. Unfiltered material is led into the chamber to surround and nearly immerse the machine. The filtered liquid content passes through the filtering medium into the interior of the machine from which point it is led out through the discharge passage indicated. Solids and other material collected by the filter surface and sludge plates are carried to the top of the endless band, the sludge plates are withdrawn to the interior, and the cleaning device comprising the brushes 17 and other working parts operate to brush off the solids from the filter surface into the receptacles provided for the digestion treatment at the end of the system. Fig. 10 shows a top plan view of the machine illustrated in Fig. 9.

From the foregoing it will be obvious that the invention provides a filter mechanism having an unusually high percentage of filter surface and a structure which will be positive in the removal of solids from the material to be clarified, and that a system is provided in which the sludge digestion is greatly facilitated by the combination of the mechanical separation from sewage of the solids with their organic content and the treatment of the same in sludge digestion tanks.

It will be understood that while particular reference is made to the use of the herein described structures as pertaining to the treatment of sewage, the invention includes the use of the same in any branch of work in which filtration and separation of liquids from solids may be of use.

Changes in design, shape, material, relative location of parts, operation and the use of the apparatus or system may be made without departing from the scope of the invention.

What I claim is:

1. In a machine of the character described, a movable filtering surface provided with openings therethrough, movable blade members mounted in conjunction with said surface to be in the operative position when projected in said opening beyond said surface and in the inoperative position when retracted below or level with said surface, and control means for governing the projection and retraction of said blade members.

2. In a machine of the character described, a movable filtering surface provided with openings therethrough, movable blade members mounted in conjunction with said surface to be in the operative position when projected in said opening beyond said surface and in the inoperative position when retracted below or level with said surface, control means for governing the projection and retraction of said blade members, and a movable cleaning device mounted to engage with said filtering surface and remove material therefrom.

3. In a machine of the character described, a movable filtering surface provided with openings therethrough, movable blade members mounted in conjunction with said surface to be in the operative position when projected in said opening beyond said surface and in the inoperative position when retracted below or level with said surface, control means for governing the projection and retraction of said blade members, and a movable cleaning device mounted to engage with said filtering surface and remove material therefrom, said control means being arranged to retract said blade members as the filtering surface approaches said cleaning device.

4. In a machine of the character described, a movable filtering surface provided with openings therethrough, movable blade members mounted in conjunction with said surface to be in the operative position when projected in said opening beyond said surface and in the inoperative position when retracted below or level with said surface, control means for governing the projection and retraction of said blade members, and a movable cleaning device mounted to engage with said filtering surface and remove material therefrom, said control means being arranged to retract said blade members as the filtering surface approaches said cleaning device, said blade members being cleaned by said device during their retracting movement.

5. In a machine of the character described, a movable filtering surface provided with openings therethrough, movable blade members mounted in conjunction with said surface to be in the operative position when projected in said opening beyond said surface and in the inoperative position when retracted below or level with said surface, control means for governing the projection and retraction of said blade members, and a movable cleaning device mounted to engage with and travel across said filtering surface and remove material therefrom.

6. In a machine of the character described, a movable filtering surface provided with openings therethrough, movable blade members mounted in conjunction with said surface to be in the operative position when projected in said opening beyond said surface and in the inoperative position when retracted below or level with said surface, control means for governing the projection and retraction of said blade members, and a movable cleaning device provided with a plurality of cleaning units arranged to engage with and travel across said filtering surface and remove material therefrom.

7. In a machine of the character described, a movable filtering surface provided with openings therethrough, movable blade members mounted in conjunction with said surface to be in the operative position when projected in said opening beyond said surface and in the inoperative position when retracted below or level with said surface, control means for governing the projection and retraction of said blade members, and a movable cleaning device mounted to engage with and travel across said filtering surface transversely to the movement of the latter to remove material therefrom.

8. In a machine of the character described, a movable filtering surface provided with openings therethrough, movable blade members mounted in conjunction with said surface to be in the operative position when projected in said opening beyond said surface and in the inoperative position when retracted below or level with said surface, control means for governing the projection and retraction of said blade members, and a movable cleaning device mounted to engage with and travel across said filtering surface, said device being rotatably mounted to have a peripheral turning movement in a direction opposite to its path of travel.

9. In a machine of the character described, a movable filtering surface provided with openings therethrough, movable blade members mounted in conjunction with said surface to be in the operative position when projected in said opening beyond said surface and in the inoperative position when retracted below or level with said surface, control means for governing the projection and retraction of said blade members, and a movable cleaning device mounted to engage with and travel across said filtering surface, said device being provided with a plurality of cleaning units rotatably mounted to have a peripheral turning movement in a direction opposite to their path of travel.

10. In a machine of the character described, a movable filtering surface provided with openings therethrough, movable blade members mounted in conjunction with said surface to be in the operative position when projected in said opening beyond said surface and in the inoperative position when retracted below or level with said surface, control means for governing the projection and retraction of said blade members, and a movable cleaning device comprising a brush mounted to engage with said filtering surface and remove material therefrom.

11. In a machine of the character described, a movable filtering surface provided with openings therethrough, movable blade members mounted in conjunction with said surface to be in the operative position when projected in said opening beyond said surface and in the inoperative position when retracted below or level with said surface, control means for governing the projection and retraction of said blade members, and a movable cleaning device comprising a brush mounted to engage with said filtering surface and remove material therefrom, said control means being arranged to retract said blade members as the filtering surface and blades approach said brush.

12. In a machine of the character described, a movable filtering surface provided with openings therethrough, movable blade members mounted in conjunction with said surface to be in the operative position when projected in said opening beyond said surface and in the inoperative position when retracted below or level with said surface, control means for governing the projection and retraction of said blade members, and a movable cleaning device comprising a brush mounted to engage with said filtering surface and remove material therefrom, said control means being arranged to retract said blade members as they approach said brush, said brush being mounted and shaped to engage with and clean said blade members during their retracting movement.

13. In a machine of the character described, a movable filtering surface provided with openings therethrough, movable blade members mounted in conjunction with said surface to be in the operative position when projected in said opening beyond said surface and in the inoperative position when retracted below or level with said surface, control means for governing the projection and retraction of said blade members, and a movable cleaning brush mounted to engage with and travel across said filtering surface, said brush being rotatably mounted to have a peripheral turning movement in a direction opposite to its path of travel.

14. In a machine of the character described, a movable filtering surface provided with openings therethrough, movable plate members mounted to move with said surface and arranged to be in the operative position when projected in said openings beyond said surface and in the inoperative position when retracted below or level with said surface, a rocker shaft, rocker arms connecting said shaft and said plate members, and control means for governing the movement of said rocker shaft and plate members.

15. In a machine of the character described, a substantially cylindrical rotary filtering machine provided with a substantially cylindrical filtering surface having slotted longitudinal openings therethrough, movable blade members mounted in conjunction with said surface to be in the operative position when projected in said openings beyond said surface and in the inoperative position when retracted below or level with said surface, and control means for governing the projection and retraction of said blade members.

16. In a machine of the character described, a substantially cylindrical rotary filtering machine provided with a substantially cylindrical filtering surface having slotted openings therethrough, movable blade members mounted within said cylindrical machine to be in the operative position when projected in said openings beyond said surface and in the inoperative position when retracted below or level with said surface to the interior of the machine, and control means for governing the projection and retraction of said blade members.

17. In a filtering system of the character described, a substantially cylindrical hollow rotary filtering machine provided with a substantially cylindrical filtering surface, a tank member surrounding said rotary filtering machine and within which said machine is adapted to be immersed in the liquid material contained in said tank, an inlet passage for conducting unfiltered material to the exterior of said filtering machine and surface within said tank, an outlet passage for the liquid separated from said material leading from the interior of said hollow filtering machine, and a movable cleaning device provided with a plurality of cleaning units mounted to engage with and travel across said filter surface.

18. In a filtering system of the character described, a rotary filtering machine provided with a movable filtering surface, movable blade members mounted in conjunction with said surface to be in the operative position when projected beyond said surface and in the inoperative position when retracted below or level with said surface, an inlet passage for conducting unfiltered material to the exterior of said filtering machine and surface, and an outlet passage for the liquid separated from the material leading from the interior of said filtering machine.

19. In a machine of the character described, a movable filter surface provided with an opening therethrough, a movable blade member mounted in conjunction with said surface to be in the operative position when projected in said opening beyond said surface and in the inoperative position when retracted below or level with said surface, control means for governing the movement of said blade member, a movable cleaning member mounted to engage with and travel across said filtering surface, and means for providing said cleaning member with a rotary peripheral movement in a direction opposite to that of its travel.

In testimony whereof I have hereunto set my hand.

MARCUS B. TARK.